(12) United States Patent
Sagawa (10) Patent No.: US 11,076,093 B2
(45) Date of Patent: Jul. 27, 2021

(54) IMAGE PROCESSING METHOD

(71) Applicant: NATIONAL INSTITUTE OF ADVANCED INDUSTRIAL SCIENCE AND TECHNOLOGY, Tokyo (JP)

(72) Inventor: Ryusuke Sagawa, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 137 days.

(21) Appl. No.: 16/479,370

(22) PCT Filed: Jan. 15, 2018

(86) PCT No.: PCT/JP2018/000873
§ 371 (c)(1),
(2) Date: Jul. 19, 2019

(87) PCT Pub. No.: WO2018/139237
PCT Pub. Date: Aug. 2, 2018

(65) Prior Publication Data
US 2019/0387164 A1 Dec. 19, 2019

(30) Foreign Application Priority Data
Jan. 25, 2017 (JP) .............................. JP2017-011501

(51) Int. Cl.
*G06F 3/14* (2006.01)
*G06T 5/20* (2006.01)
(Continued)

(52) U.S. Cl.
CPC ......... *H04N 5/23229* (2013.01); *G01B 11/25* (2013.01); *G06F 3/14* (2013.01);
(Continued)

(58) Field of Classification Search
CPC .. H04N 5/23229; H04N 5/2256; H04N 5/455; G06T 7/521; G06T 5/002;
(Continued)

(56) References Cited

U.S. PATENT DOCUMENTS

2002/0135467 A1 9/2002 Koike
2011/0014982 A1 1/2011 Hiraishi
(Continued)

FOREIGN PATENT DOCUMENTS

JP S54-049191 A 4/1979
JP S63-109309 A 5/1988
(Continued)

OTHER PUBLICATIONS

Decision of Refusal dated Mar. 3, 2020, issued in Japanese Patent Application No. 2018/564479.
(Continued)

*Primary Examiner* — Wesley J Tucker
(74) *Attorney, Agent, or Firm* — Workman Nydegger (57) ABSTRACT

The shape of a moving object is reconstructed from a shot image under relatively-strong ambient light or an embedded image is demodulated from a video image in which an image that may not be visually recognized is embedded to display the image. The image processing method of the present invention includes irradiating flashing light to the surface of the object based on a spreading signal obtained by spread spectrum modulation, receiving reflected light from the surface of the object to output the signal including the image information, a filtering for eliminating noise including a low-frequency component from the signal including the image information, inverse-spreading the signal after the filtering to demodulate the signal, and outputting, based on a signal obtained by the demodulation, an image reflecting the state of the surface of the object.

13 Claims, 9 Drawing Sheets

(51) Int. Cl.
    *H04N 5/225*     (2006.01)
    *H04N 5/232*     (2006.01)
    *G06T 7/521*     (2017.01)
    *G01B 11/25*     (2006.01)
    *G06T 5/00*     (2006.01)
    *H04B 1/7097*     (2011.01)
    *H04N 5/455*     (2006.01)

(52) U.S. Cl.
    CPC ............... *G06T 5/002* (2013.01); *G06T 5/20* (2013.01); *G06T 7/521* (2017.01); *H04B 1/7097* (2013.01); *H04N 5/2256* (2013.01); *H04N 5/455* (2013.01); *G06T 2207/10016* (2013.01); *H04B 2201/709709* (2013.01)

(58) Field of Classification Search
    CPC ............ G06T 5/20; G06T 2207/10016; G06T 2207/20056; G06T 5/003; G01B 11/25; G06F 3/14; H04B 1/7097; H04B 2201/709709
    See application file for complete search history.

(56) References Cited

U.S. PATENT DOCUMENTS

| | | | |
|---|---|---|---|
| 2011/0081072 A1 | 4/2011 | Kawasaki et al. | |
| 2012/0237079 A1 | 9/2012 | Hanyu et al. | |
| 2013/0002882 A1* | 1/2013 | Onozawa | H04N 5/332 348/164 |
| 2013/0335531 A1* | 12/2013 | Lee | G06T 7/507 348/46 |
| 2015/0010201 A1* | 1/2015 | Burini | G06T 1/0021 382/100 |
| 2015/0221093 A1 | 8/2015 | Sagawa et al. | |
| 2016/0109575 A1* | 4/2016 | Oggier | G01S 17/894 356/5.01 |
| 2016/0349359 A1 | 12/2016 | Nevet | |

FOREIGN PATENT DOCUMENTS

| | | |
|---|---|---|
| JP | H07-325095 A | 12/1995 |
| JP | H11-41571 A | 2/1999 |
| JP | 2003-126786 A | 5/2003 |
| JP | 2000-269886 A | 8/2003 |
| JP | 2006-322759 A | 11/2006 |
| JP | 2007-164282 | 6/2007 |
| JP | H11-311510 A | 10/2008 |
| JP | 2009-245349 A | 10/2009 |
| JP | 2011-242183 A | 12/2011 |
| JP | 2011-142607 A | 9/2012 |
| JP | 53-17169 B2 | 7/2013 |
| JP | 2014-195263 A | 10/2014 |
| JP | 57-61750 B2 | 6/2015 |
| JP | 2015-200544 A | 11/2015 |
| WO | 2011/132241 A1 | 10/2011 |
| WO | 2014/020823 A1 | 2/2014 |

OTHER PUBLICATIONS

International Search Report dated Mar. 13, 2018, issued in PCT Application No. PCT/JP2018/00873, filed Jan. 15, 2018.
International Preliminary Report on Patentability dated Jul. 30, 2019, issued in PCT Application No. PCT/JP2018/00873, filed Jan. 15, 2018.
Ryusuke Sagawa et al., *Linear Solution for Oneshot Active 3D Reconstruction Using Multiple Projectors*, In Proc. Fifth International Symposium on 3D Data Processing, Visualization and Transmission, May 2019, pp. 8.
Ryusuke Sagawa et al., *Dense One-shot 3D Reconstruction by Detecting Continuous Regions with Parallel Line Projection*, 2011 IEEE International Conference on Computer Vision, pp. 1911-1918.
Yoav Y. Schechner et al., *A Therory of Multiplexed Illumination*, Proceedings of the Ninth IEEE International Conference on Computer Vision (ICCV 2003) 2-vol. Set, 2003, pp. 8.
Lisa M. Marvel et al., *Spread Spectrum Image Steganography*, IEEE Transactions on Image Processing, vol. 8, No. 8, Aug. 1999, pp. 1075-1083.
Supplementary European Search Report dated Jul. 20, 2020, issued in EP Application No. 18744822.0.
W. Thomas Miller, III, *Video Image Stereo Matching Using Phase-Locked Loop Techniques*, IEEE, 1986, XP000319645, pp. 112-117.
Decision of Refusal dated Mar. 3, 2020, issued I Japanese Patent Application No. 2018/564479.
Japanese Office Action, English Translation, for JP 2018-564479 filed Oct. 29, 2018, dated Feb. 2, 2021.
Japanese Office Action dated Apr. 27, 2021, from Application No. 2018-564479.

* cited by examiner

(a) Pattern on (b) $L = 15$ (c) $L = 63$ (d) $L = 255$

IMAGE PROCESSING METHOD

TECHNICAL FIELD

The present invention relates to an image processing method, and specifically, to an image processing method to reconstruct an object shape or to display a concealed image on a screen or the like, by processing shot images including a specific pattern projected on a surface of the object under ambient light or displayed on the screen.

BACKGROUND ART

Conventionally, an image processing system/method which reconstructs an object shape based on shot images by using a light source such as a projector and a camera are suggested. For example, PTL 1 discloses an image processing method to reconstruct a shape of a target object based on shot images including a grid pattern projected on a target object for observation. PTL 2 discloses an image processing method to reconstruct an object shape by using a phase of a synchronous pattern obtained by demodulating shot images including a projected pattern on a moving object. PTL 3 discloses an image processing method to reconstruct an object shape by using a band-pass filter based on shot images including a grid pattern projected on an object under ambient light.

NPL 1 discloses an image processing method to reconstruct a shape of an object based on shot images by a camera under conditions that a plurality of light sources simultaneously irradiate lights to the object according to a pattern based on a Hadamard matrix. Furthermore, NPL 2 discloses a method to demodulate and restore (or display) information embedded in an image based on the spread spectrum modulation.

CITATION LIST

Patent Literature

PTL 1: Japanese Patent No. 5317169
PTL 2: Japanese Patent No. 5761750
PTL 3: International Publication WO2014/020823

Non Patent Literature

NPL 1: Proceedings of the Ninth IEEE International Conference on Computer Vision (ICCV'03)
NPL 2: IEEE TRANSACTIONS ON IMAGE PROCESSING, VOL. 8, NO. 8, pp 1075-1083, AUGUST 1999

SUMMARY OF INVENTION

Technical Problem

Each of the Patent Literatures and Non Patent Literatures described above would achieve its individual objective relevant to the image processing method to reconstruct the object shape based on the shot images or to restore the embedded information in the image. However, these publications do not disclose an effective image processing method to reconstruct the object shape of a moving object under relatively-strong ambient light based on the shot images, or to demodulate a video image in which an invisible image is embedded and display the embedded image.

Solution to Problem

An image processing method according to one embodiment of the present invention includes: (a) irradiating flashing light to a surface of an object based on a spreading signal obtained by spread spectrum modulation, (b) receiving reflected light from the surface of the object to output a signal including image information, (c) filtering for eliminating noise including a low-frequency component from the signal including the image information, (d) inverse-spreading and demodulating the signal after the filtering, and (e) outputting an image reflecting a state of the surface of the object based on a signal obtained by the demodulating.

The image processing method of another embodiment of the present invention includes (a) preparing an image embedded in a video image to be displayed on a display screen, where the embedded image is displayed by lighting pixels of the display screen based on a spreading signal obtained by spread spectrum modulation, (b) shooting the video image including the embedded image displayed on the display screen, (c) filtering for eliminating noise including a low-frequency component from a signal of the shot video image, (d) inverse-spreading and demodulating the signal after the filtering, and (e) outputting the embedded image based on a signal obtained by the demodulating.

An image processing system of one embodiment of the present invention includes (a) a light source for irradiating flashing light to a surface of an object based on a spreading signal obtained by spread spectrum modulation, (b) an imaging apparatus for receiving reflected light from the surface of the object and outputting a signal including image information, (c) a filter for eliminating noise including a low-frequency component from the signal including the image information, (d) an operation processing apparatus for inverse-spreading and demodulating the signal after processing by the filter, and (e) a display apparatus for displaying an image reflecting a state of the surface of the object based on a signal obtained by the demodulating.

Advantageous Effects of Invention

According to the present invention, the shape of an object at rest or a moving object cab be measured under ambient light by using the illumination of spread spectrum modulation light to an object and a filtering processing of shot images of the object under irradiation. Also according to the present invention, video may be embedded using the spread spectrum modulation in a video image to thereby display embedded image demodulated from shot images of the video image.

DESCRIPTION OF EMBODIMENTS

Figure 1:
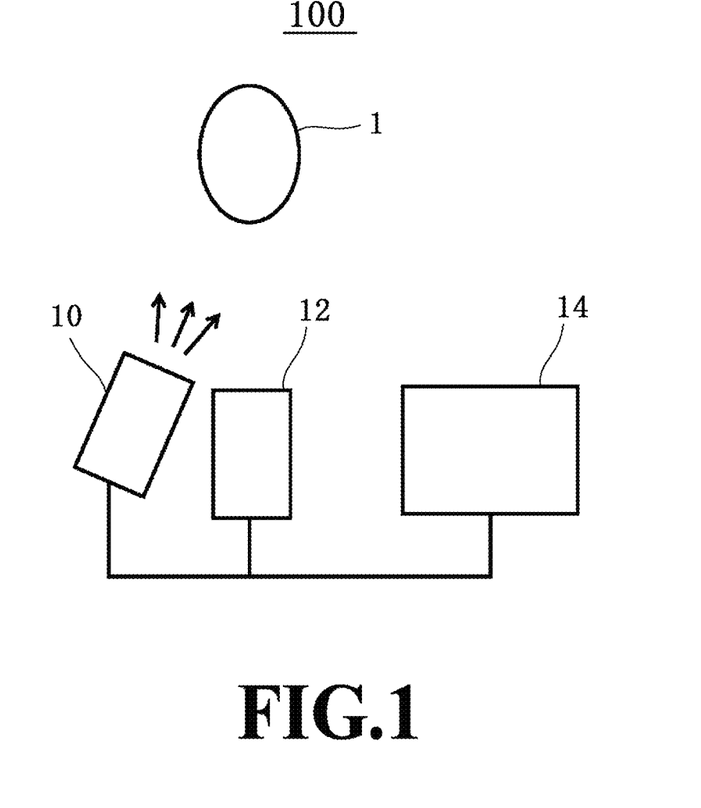
FIG. 1 illustrates the configuration of an image processing system of one embodiment of the present invention.

With reference to the drawings, the following section will describe an embodiment of the present invention. FIG. 1 illustrates the configuration of an image processing system of one embodiment of the present invention. An image processing system 100 includes a light source 10 for irradiating light to an object 1, an imaging apparatus 12 that may receive reflected light from the surface of the object, and an operation processing apparatus 14 that is connected to the light source 10 and the imaging apparatus 12. The object 1 is an object that may be an object for which light may be reflected at least from the surface of the outer shape, in other words, an object whose video image may be shot by the imaging apparatus 12, and it may be not only a stationary object but also a moving object. The moving object may be an (automatic) object moving by itself or a (passive) object moved by another means (mechanism).

The light source 10 is configured to irradiate light to the surface of the object 1 based on a spreading signal obtained by the spread spectrum modulation. The spreading signal obtained by the spread spectrum modulation, is supplied from the operation processing apparatus 14. The light source 10 may be a light-irradiating source such as a light-irradiating diode (LED), laser diode (LD), or a video projector. More specifically, the light source 10 may be a laser pattern projector that may project a predetermined pattern (e.g., a dot pattern) onto the surface of the object 1 for example. The light source 10 may be a light source including the spectrum/spectra of a single wavelength or a plurality of wavelengths. The light source 10 may be at least one light source or may be the same or different types of light sources that may irradiate light from two or more different directions.

The imaging apparatus 12 may be a camera such as an image sensor (area sensor) consisting of CMOS or CCD for example. The imaging apparatus 12 may be a monochrome or color (RGB) camera or a hyper spectrum camera. The imaging apparatus 12 must perform a shooting operation in synchronization with the light emission (flashing) of the light source 10 and thus may be a high-speed camera having a high shooting speed (frame/second). The imaging apparatus 12 outputs the signal including the image information (video data) to the operation processing apparatus 14.

The operation processing apparatus 14 may be a personal computer (PC) including a processor (CPU), a memory, and a display for example that numerically calculates the signal including the image information (video data) received from the imaging apparatus 12 to display the image. The operation processing apparatus 14 also may function as a filter providing the operation processing function thereof to eliminate noise including a low-frequency component from the signal including the image information (video data). The filter may be configured as an apparatus independent from or accompanying the operation processing apparatus 14. The operation processing apparatus 14 further has a function for inverse-spreading and demodulating the signal after processing by the filter. Based on a signal obtained by the demodulating, an image reflecting the state of the surface of the object is displayed on the display provided in the operation processing apparatus 14.

Figure 2:
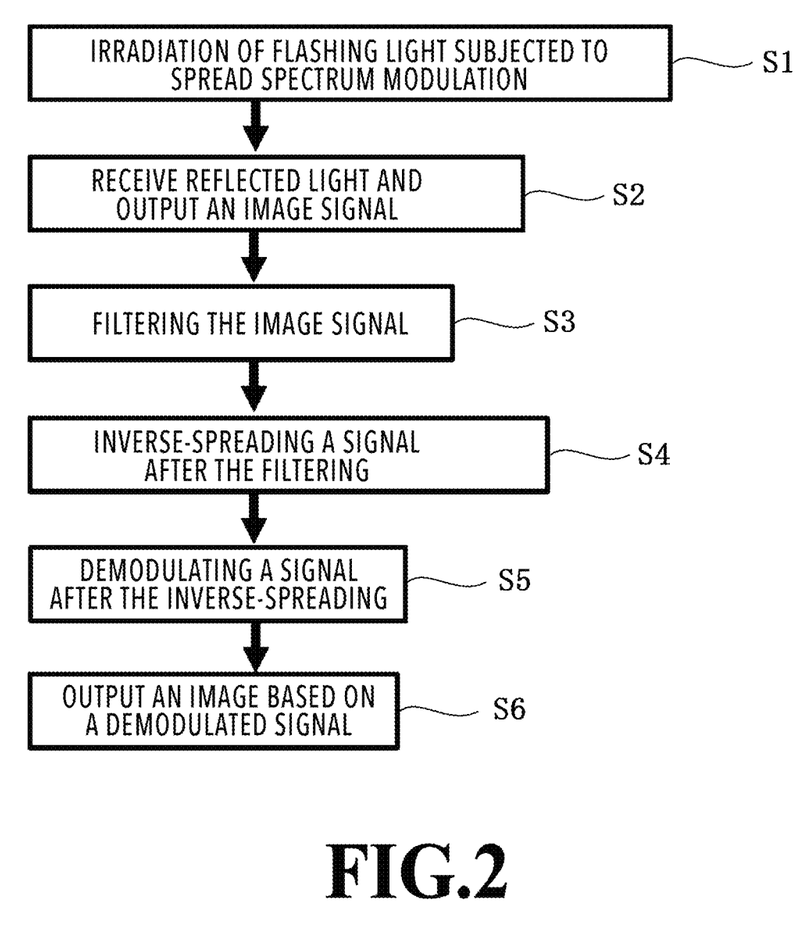
FIG. 2 illustrates the flow of an image processing method of one embodiment of the present invention.

FIG. 2 illustrates the flow of an image processing method of one embodiment of the present invention. The flow of FIG. 2 may be performed using the image processing system of FIG. 1 for example. The flow of FIG. 2 may be performed under indoor or outdoor ambient light (e.g., indoor lighting or sunlight). The ambient light may be ambient light having a relatively-strong light intensity (brightness) so long as the output from the respective photodetectors of the imaging apparatus 12 is not saturated. The system and the method of the present invention may have one characteristic that a specific image of the object surface may be obtained even under the relatively-strong ambient light (noise).

In Step S1 of FIG. 2, flashing light is irradiated to the surface of the object based on the spreading signal obtained by the spread spectrum modulation. Specifically, in the system of FIG. 1 for example, the light emission from flashing light is irradiated from the light source 10 to the surface of the object 1 based on the spreading signal obtained by the spread spectrum modulation. The spreading signal obtained by the spread spectrum modulation is generated by the operation processing apparatus 14. As described above, the object 1 also may include not only an object at rest but also a moving object. The spread spectrum modulation may be performed using a direct sequence spread spectrum (DS).

In the direct sequence spread spectrum (DS), the spreading signal obtained by the spread spectrum modulation may be obtained by multiplying, with a spreading code composed of a pseudo random noise (PN)-sequence, the original signal (reference signal) to which the primary modulation was applied. The spreading code may include the longest series (MLS) code having a length L for example. The longest series (MLS) code having the length L may be generated using a linear feedback shift register (LFSR) included in the operation processing apparatus 14 for example. The spreading code also may be a Hadamard matrix including codes (−1 and 1) or an S matrix including a code (0, 1).

The flashing light may be configured to include a predetermined grid pattern for example by using a laser pattern projector as the light source 10. The flashing light also may include the spectrum having a single wavelength or a plurality of wavelengths. The flashing light may be irradiated to the object 1 in a plurality of different directions. In Step S2, the reflected light from the surface of the object is received to output the signal including the image information. Specifically, in the system of FIG. 1 for example, the reflected light from the surface of the object 1 is received by the imaging apparatus 12, in other words, the system shoots the object 1 irradiated with flashing light by the imaging apparatus 12, stores the resultant shot images in a built-in memory, and sends the shot images to the operation processing apparatus 14.

In Step S3, a filtering is performed to eliminate noise including a low-frequency component from the signal including the image information. Specifically, in the system of FIG. 1 for example, the operation processing apparatus 14 uses a high-pass filter and selectively uses a spatial filter to process a shot video signal (video data) for eliminating a noise component. This noise component includes noise having a relatively-low frequency caused by ambient light during the shooting operation. The high-pass filtering may use the inverse discrete Fourier transform (IDFT) function for example to further use a window function (e.g., Hanning Window) (i.e., filtering by the high-pass filter may multiply the shot image signal (video data) with these functions) to thereby eliminate the low frequency noise and ripple noise. The spatial filtering may use a Gaussian filter for example.

In Step S4, the signal (video data) after the filtering is inversely spread. Specifically, the signal after the filtering is multiplied with an inverse-spreading code to generate an inverse-spread signal. The inverse-spreading code may be the same code as the spreading code. In Step S5, the inversely spread signal is demodulated. The inverse-spreading in Step S4 and the demodulation in Step S5 may be simultaneously (or continuously) carried out in one step. In Step S6, based on a signal obtained by the demodulation, an image reflecting the state of the surface of the object is outputted. The image (video) may be displayed on a display provided in the operation processing apparatus 14.

The spread spectrum modulation (direct sequence spread spectrum) used in the image processing method in FIG. 2 has been conventionally used, as shown by the following equations (1)-(5) describing the signal flow, in the technical field such as radio communication. Features of the present invention significantly different from the prior art are (i) to use a light irradiated from a light source to an object, the light being flashing light to which spread spectrum modulation was applied, and (ii) to eliminate a noise component caused by ambient light or the like, by applying predetermined filtering before inverse-spreading the shot images of the object irradiated with the flashing light.

<Signal Flow Based on Direct Sequence Spread Spectrum>

The reference signal $s_k$ at the time $t_k$ is converted by function F to the primary modulation signal $M_1(t_k)$. It is established that $kT \le t_k < (k+1)T$ (T: reference signal cycle, k: time step).

Equation 1

$$M_1(t_k)F(s_k) \tag{1}$$

The modulation signal M1($t_k$) is divided to L chips (transmission data bit) at the time step k and is subsequently spectrum-diffused by the code S to thereby generate the spread spectrum modulation signal $M_2(t_k)$.

Equation 2

$$M_2(t_k)=S(t-kT) \cdot M_1(t_k) \tag{2}$$

Noise $n(t_k)$ is added to the modulation signal $M_2(t_k)$ to be transmitted and the resultant signal is received as a reception signal $M'_2(t_k)$.

Equation 3

$$M'_2(t_k)=M_2(t_k)+n(t_k) \tag{3}$$

The reception signal $M'_2(t_k)$ is inversely spread by the inverse-spreading code S' to thereby generate the signal $D(t_k)$.

Equation 4

$$D(t_k)=S'(t-kT) \cdot M'_2(t_k) \tag{4}$$

Finally, the inverse-spread signal $D(t_k)$ is demodulated using function F' corresponding to the function F to thereby generate signal $s_k'$ by the demodulation.

Equation 5

$$s'_k=F'(D(t_k)) \tag{5}$$

The following section will further describe the filtering, the inverse-spreading, and the demodulate processing of shot video when a moving object is observed under ambient light. The ambient light may be recognized, in a scene including no move, as a substantially-constant direct current (DC) component in a shot video signal. However, the direct current (DC) component is, in a scene including a move, not constant and includes a relatively-low-frequency component changing depending on the move of the moving object slower than the shooting speed (frame rate). Thus, when a moving object is observed under ambient light, a high-pass filter must be used to eliminate the low-frequency component from the video signal to demodulate the resultant signal.

The high-pass filter through which a frequency higher than the frequency $\omega_T$ is allowed to pass may be represented by equation (6) as a frequency region.

Equation 6

$$H(\omega) = \begin{cases} 1 & \omega > \omega_T \\ 0 & \text{otherwise} \end{cases} \tag{6}$$

The high-pass filter h(t) in a time domain may be defined by equation (7).

Equation 7

$$h(t)=\omega(t) \cdot \text{IDFT}(H(\omega)) \tag{7}$$

In the equation, IDFH(H) means the inverse discrete Fourier transform (IDFT) of H($\omega$) and $\omega$(t) means the Hanning Window (Hanning Window) defined by $\omega(t)=0.5-0.5 \cos(2\pi/L_\omega)$. When the noise n(t) includes only a low-frequency component, the convolution with h(t) results in h(t)*n(t)=0. The influence by the ambient light may be eliminated by the convolution of the reception signal $M'_2(t)$ and the high-pass filter h(t).

When the spreading code S(t) uses a longest series (MLS) code, the result is the inverse-spreading code S'(t)=S(t). When the moving object is observed and the low-frequency component is not zero, the inverse-spreading signal D(t) is as shown in equation (8).

Equation 8

$$\begin{aligned} D(t) &= S'(t) \circ M'_2(t) \\ &= S(t) \circ (h(t) * (M_2(t) + n(t)) \\ &= S(t) \circ (h(t) * M_2(t)) \end{aligned} \tag{8}$$

However, if the spectrum diffusion signal also has a low-frequency component that is not zero, the signal inverse-spread by equation (8) is influenced by the high-pass filter. Thus, the function F' for demodulation must be deformed depending on the original function F.

An additional noise filter may be obtained by a combination with a spatial filter. By assuming that peripheral pixels receive similar signals, g(x, y) as a Gaussian filter may be applied to the reception signal. The terms x and y show the coordinate of the pixel. In this case, the inverse-spreading signal D is deformed as shown in equation (9).

Equation 9

$$D(t,x,y)=S(t) \cdot (h(t)*g(x,y)*M'_2(t,x,y)) \tag{9}$$

Next, the following section will examine, as a simple case using the modulation function F, the amplitude modulation of a direct current (DC) component. As described in equation (1), it is established that the primary modulation signal $M_1(t_k)=S_k$. However, it is established that $kT_b \le t_k < (k+1)T_b$ ($T_b$: reference signal cycle, k:time step). First, a case is assumed where one light source is used. It is assumed that "s" is a transmission signal when $kT_b \le t_k < (k+1)T_b$ is established and "m" shows a vector of the reception signal $M'_2(t)$ after the application of the spatial filter. Furthermore, based on the spreading code, it is assumed that the vector S=[S(t)](t=ikT$_b$/L, i=0, . . . , L−1). A row vector "h" consisting of a high-pass filter value is used to define an L×(L+L$_\omega$−1) matrix H by equation (10).

Equation 10

$$H = \begin{bmatrix} h & 0 & \ldots & 0 & 0 \\ 0 & h & 0 & \ldots & 0 \\ & & \ldots & & \\ 0 & \ldots & 0 & 0 & h \end{bmatrix} \quad (10)$$

Equation (11) is obtained by using the high-pass filter to eliminate the noise low-frequency component that is not zero.

Equation 11

$$HSs = Hm \quad (11)$$

Solution of equation (11) based on the least-squares method results in equation (12).

Equation 12

$$s = (S^T H^T HS)^{-1} S^T H^T Hm. \quad (12)$$

The coefficient matrices on the right side of equation (12) correspond to composite functions representing the inverse-spreading and the demodulation, and are used as filters convoluted with received signals for the demodulation.

When a case is assumed where a plurality of light sources are used, the individual signals are extracted using a spreading code circular-shifted from a code given by the longest series (MLS). It is assumed that S$_j$ is a column vector of the spreading code given by "j" circular shifts S. When M light sources are used, the coefficient matrix may be obtained by (13) as in the above-described case of one light source.

Equation 13

$$(Q^T H^T HQ)^{-1} Q^T H^T H, \quad (13)$$

In the equation, Q means the matrix of the spreading code represented by equation (14).

Equation 14

$$Q = [S_{j1} S_{j2} \ldots S_{jM}] \quad (14)$$

Figure 3:
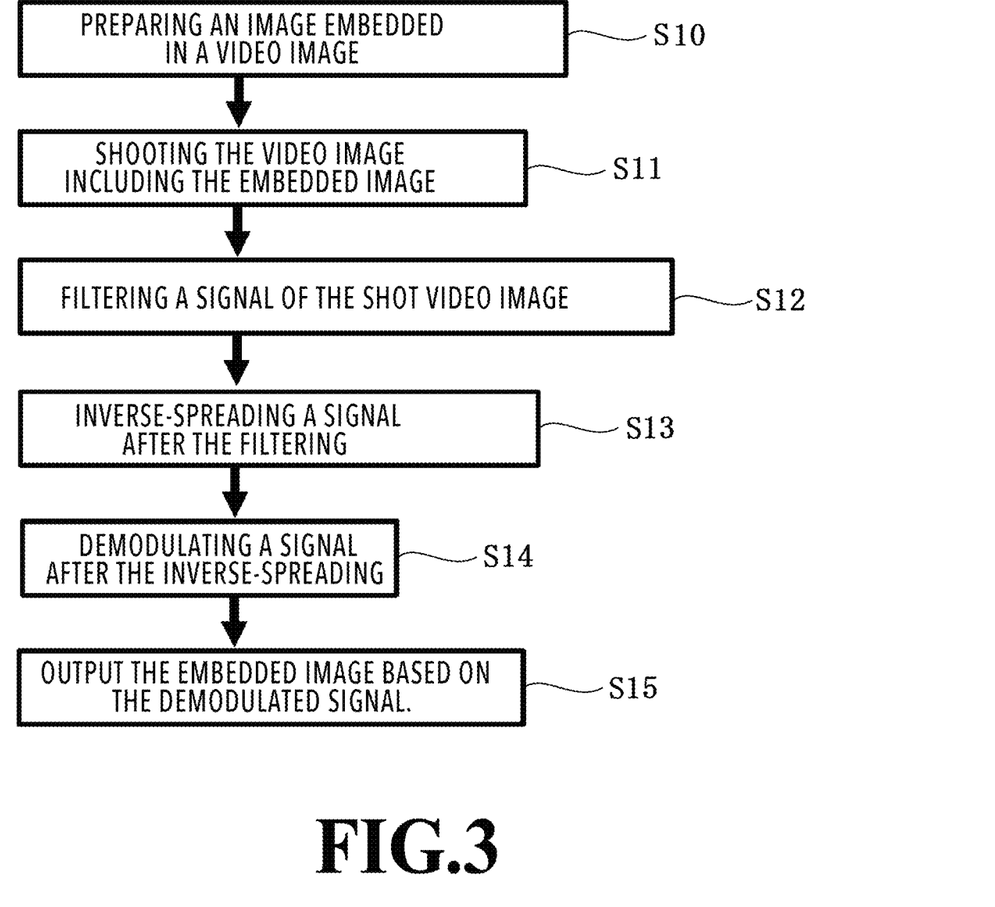
FIG. 3 illustrates the flow of the image processing method of another embodiment of the present invention.

FIG. 3 illustrates the flow of the image processing method of another embodiment of the present invention. The flow of FIG. 3 may be carried out using the imaging apparatus 12 and the operation processing apparatus 14 in the system of FIG. 1 for example. In Step S10, embedded image in a video image to be displayed on a display screen is prepared. Specifically, the spreading signal obtained by the spread spectrum modulation is generated to display embedded image by the operation processing apparatus 14 into the video image for example. Based on the spreading signal obtained by the spread spectrum modulation, the video is prepared so as to be displayed on the display included in the operation processing apparatus 14 (or to light the pixels of the display). The display includes a liquid crystal monitor or a video projector for example. The display of the embedded image to which the spread spectrum modulation is applied, is set to a low optical output with a relatively-high frequency (the brightness of the respective pixels) so that the video may not be directly visually recognized during the reproduction of the video image.

In Step S11, the system shoots the video image including the embedded image displayed on the display screen. Specifically, the imaging apparatus 12 shoots a video image including the embedded image reproduced by the display of the operation processing apparatus 14 for example. The shot video image (video data) is stored in a built-in memory of the imaging apparatus 12 and is further sent to the operation processing apparatus 14. In Step S12, the operation processing apparatus 14 performs filtering to eliminate noise including a low-frequency component from a signal of the shot video image (video data). This filtering may be basically performed by a method similar to the above-described filtering in Step S3 of FIG. 2.

In Step S13, the signal (video data) after the filtering is inversely spread. Specifically, the signal after the filtering is multiplied with an inverse-spreading code to thereby generate an inverse-spread signal. The inverse-spreading code may be the same code as the spreading code. In Step S14, the inverse-spread signal is demodulated. The inverse-spreading of Step S13 and the demodulation of Step S14 may be simultaneously (or continuously) performed in one step. In Step S15, based on the signal obtained by the demodulation, the embedded image embedded in the video image is outputted. The video may be displayed on the display provided in the operation processing apparatus 14. This consequently allows the so called "hidden" embedded image in the video image to be visually recognized.

Illustrative Embodiment 1

Figure 4:
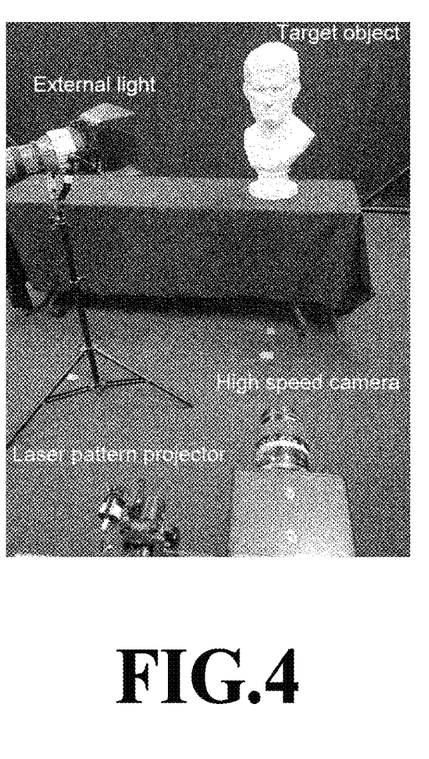
FIG. 4 illustrates Illustrative Embodiment 1 of the present invention.
Figure 5:
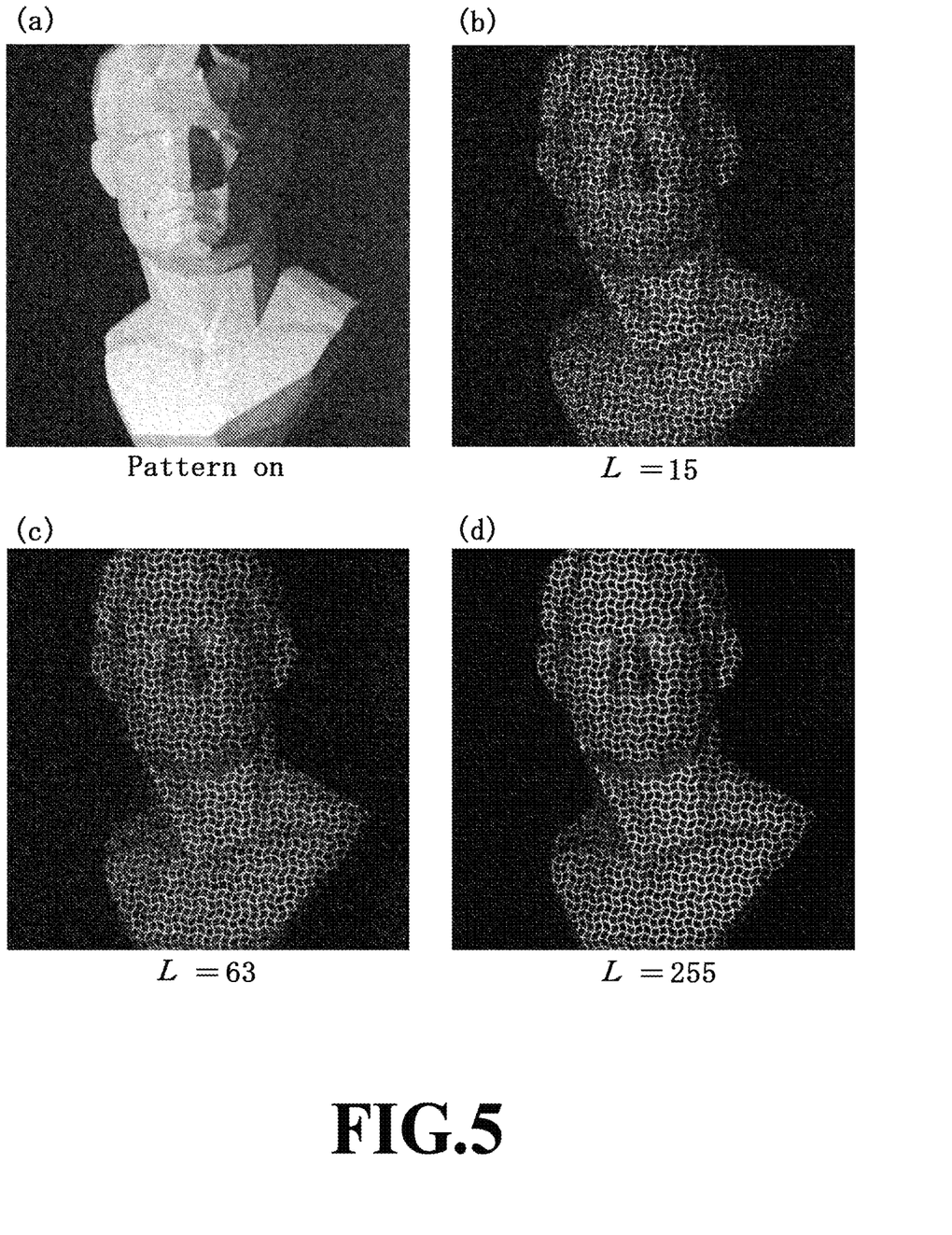
FIG. 5 illustrates Illustrative Embodiment 1 of the present invention.

With reference to FIG. 4 and FIG. 5, the following section will describe Illustrative Embodiment 1. Illustrative Embodiment 1 is an example in which an engraved sculpture is shot while irradiating a grid pattern onto the surface of the engraved sculpture as a target object under strong ambient light and the system displays (or reproduces) the image of the engraved sculpture including the grid pattern. FIG. 4 shows the layout during the measurement. A lamp simulating the ambient light (external light) is provided in front of the engraved sculpture (target object) in an oblique direction. A laser pattern projector (laser pattern projector) for floodlighting the grid pattern to which the spread spectrum modulation according to the method of the present invention is applied, and a high speed camera (high speed camera) for shooting the engraved sculpture are further provided in front thereof. Although not shown, the laser pattern projector and the high speed camera are connected to a computer (PC) including a display so that the communication therebetween is achieved.

In the measurement of the layout of FIG. 4, the lamp is provided to have a distance of about 0.7 m from the engraved sculpture and has an output of 400 W and may irradiate light to the engraved sculpture at about 100K lux. The laser pattern projector is provided at a distance of about 1.7 m from the engraved sculpture and irradiates spectrum spread-modulated wave-like grid pattern light having a wavelength of about 800 nm to the surface of the engraved sculpture at the light intensity of about 40 mW. The high speed camera includes a bandpass filter that may receive light having a wavelength of about 800 nm and may shoot a 12-bit image of 512×512 pixels with 22500 FPS.

FIGS. 5(a) to 5(d) illustrate a display image by the display showing the result of the measurement based on the above-described measurement conditions. (a) shows a shot image by the high speed camera obtained when the engraved sculpture is illuminated by the lamp at about 100 Klux while irradiating the spectrum spread-modulated wave-like grid pattern light thereto. No wave-like grid pattern may be visually recognized from the image. (b)-(c) illustrate display images obtained by processing the shot image by Steps S3-S6 of the above-described image processing method of FIG. 2. The length L of the spreading code used in the spread spectrum modulation is L=15 in (b), L=63 in (c), or L=255 in (d), so that the lengths in (b)-(d) are different from each other. In any of these drawings, the wave-like grid pattern reflecting the surface shape of the engraved sculpture may be visually recognized. As may be seen, the wave-like grid pattern has visibility higher with an increase of the length L of the spreading code.

Illustrative Embodiment 2

Figure 6:
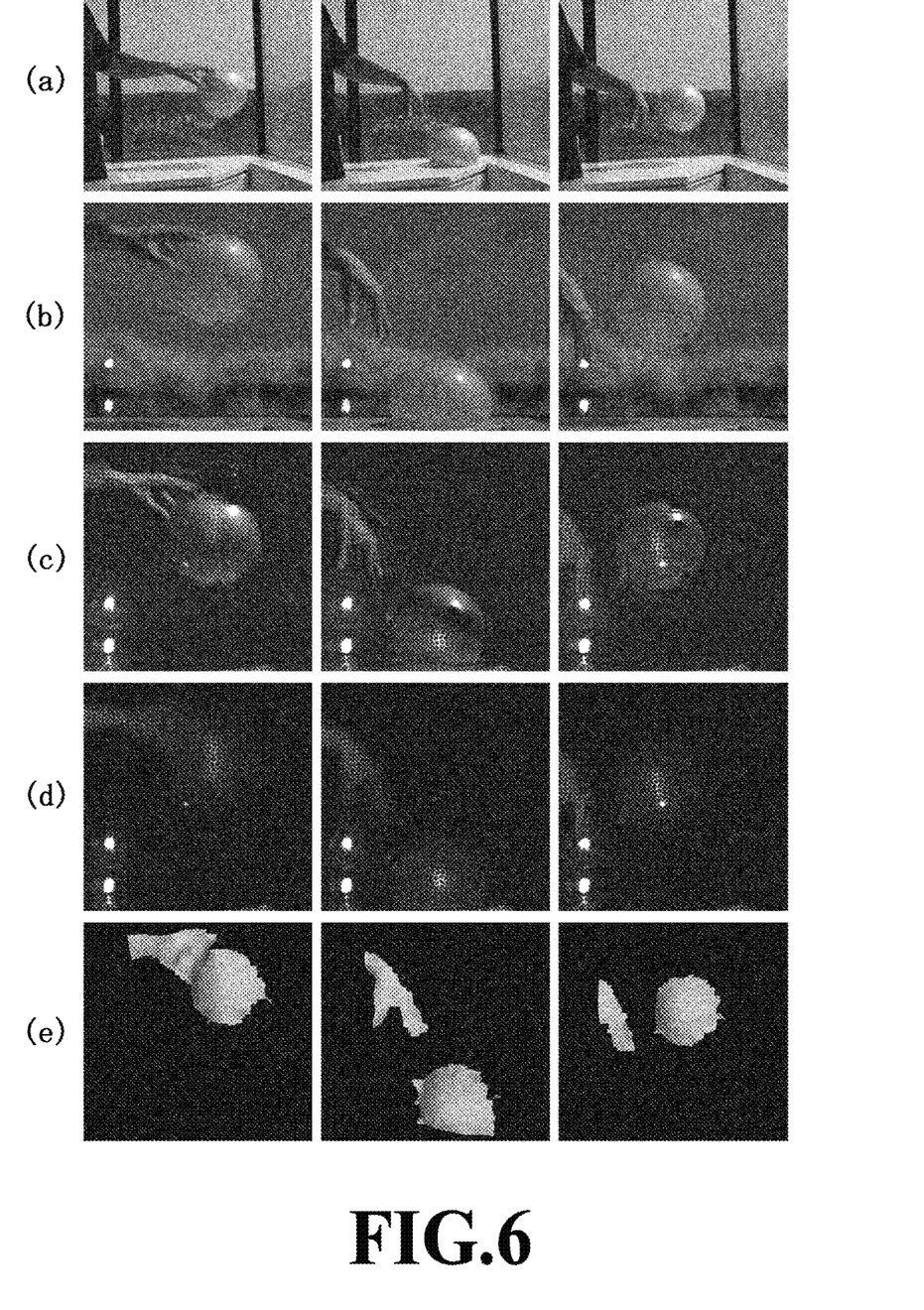
FIG. 6 illustrates Illustrative Embodiment 2 of the present invention.

The following section will describe Illustrative Embodiment 2 with reference to FIG. 6. Illustrative Embodiment 2 shows an example in which a rubber ball is shot while a grid pattern is irradiated, under sunlight, to the surface of a rubber ball (moving object) as a target object moving away from a hand and the system displays (or reproduces) an image including the grid pattern. The measurement was performed using the laser pattern projector and the high speed camera as in the case of Illustrative Embodiment 1 of FIG. 4. During the measurement, the sunlight had a brightness of about 50 Klux. The spectrum spread-modulated wave-like grid pattern light having a wavelength of about 800 nm was irradiated to the rubber ball at the light intensity of about 85 mW. The spreading code used in the spread spectrum modulation had the length L=255.

FIGS. 6(a) to 6(e) illustrate the display image by the display showing the measurement result. (a) illustrates shot images (raw images with no processing) at three instants of time obtained by shooting the moving rubber ball. (b) illustrates shot images at three instants of time obtained by irradiating the spectrum spread-modulated wave-like grid pattern light from the laser pattern projector. No wave-like grid pattern may be visually recognized from the images. (c) illustrates display images obtained by processing the shot images by Steps S3-S6 of the above-described image processing method of FIG. 2. However, the filtering processing of Step S3 was not performed. A boundary between the rubber ball and the hand has therebetween undesirable images that should not exist (noise images due to the move). (d) illustrates the display images representing a result of processing shot images based on the above-mentioned image processing method of FIG. 2, which includes filtering (processing by the high-pass filter). This indicates that the noise image caused by movement in (c) has been eliminated. (e) illustrates the three-dimensional (3D) images reconstructed based on the obtained demodulated images.

Illustrative Embodiment 3

Figure 7:
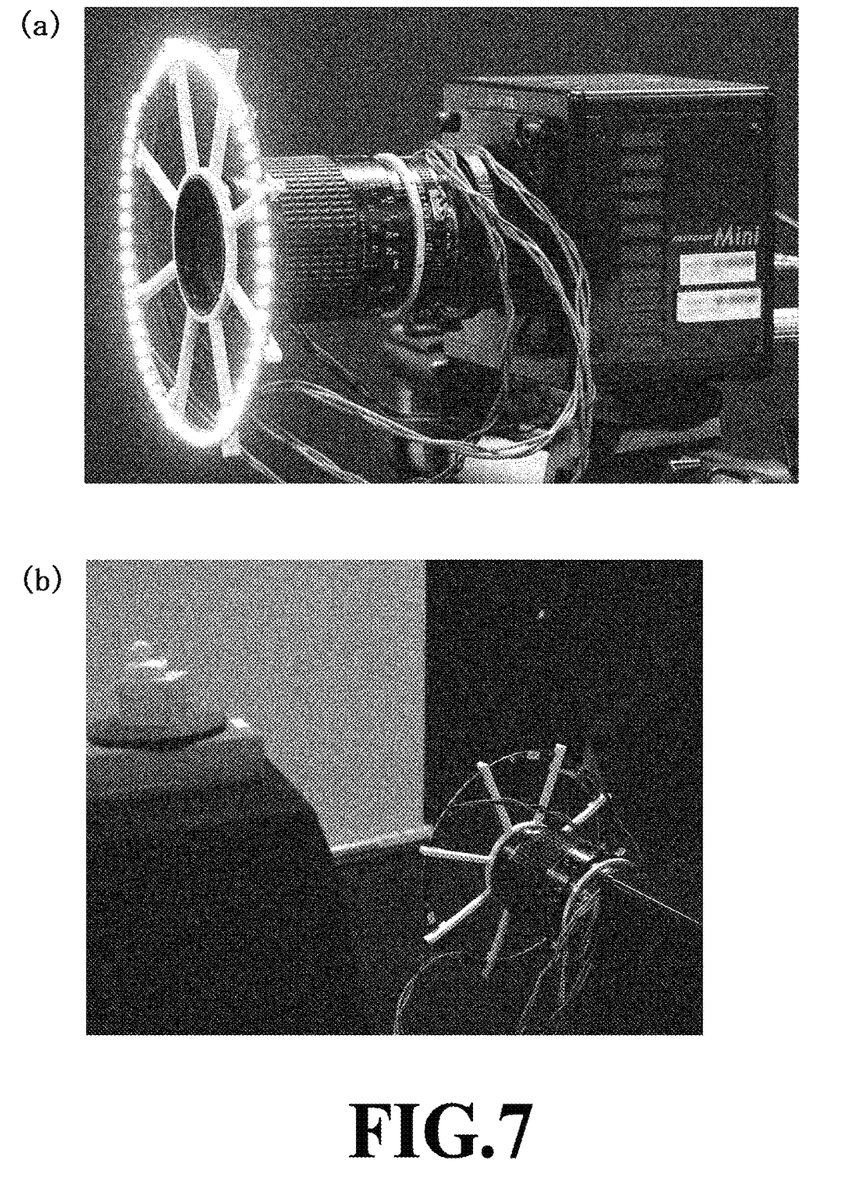
FIG. 7 illustrates Illustrative Embodiment 3 of the present invention.

The following section will describe Illustrative Embodiment 3 with reference to FIGS. 7(a) and 7(b) and FIGS. 8(a) to 8(d). Illustrative Embodiment 3 is an example when the image processing method of the present disclosure was applied to the photometric-stereo method. FIGS. 7(a) and 7(b) illustrate the measurement system. In (a), the camera lens is surrounded by 60 LEDs in a circular manner. The 60 LEDs adjacent to one another are assumed as one set to flash (ON or OFF). The LED flashing is performed using the flashing (modulation light) based on the spreading signal obtained by the spread spectrum modulation of the present disclosure. As shown in (b), a camera including the LEDs is placed to have a distance of about 1.5 m from a duck ornament as a target object placed on a base. As a result, the duck ornament is illuminated with the 6 LEDs from the 10 directions, respectively. Although not shown, as in Illustrative Embodiments 1 and 2, the duck ornament may be shot by a high speed camera.

Figure 8:
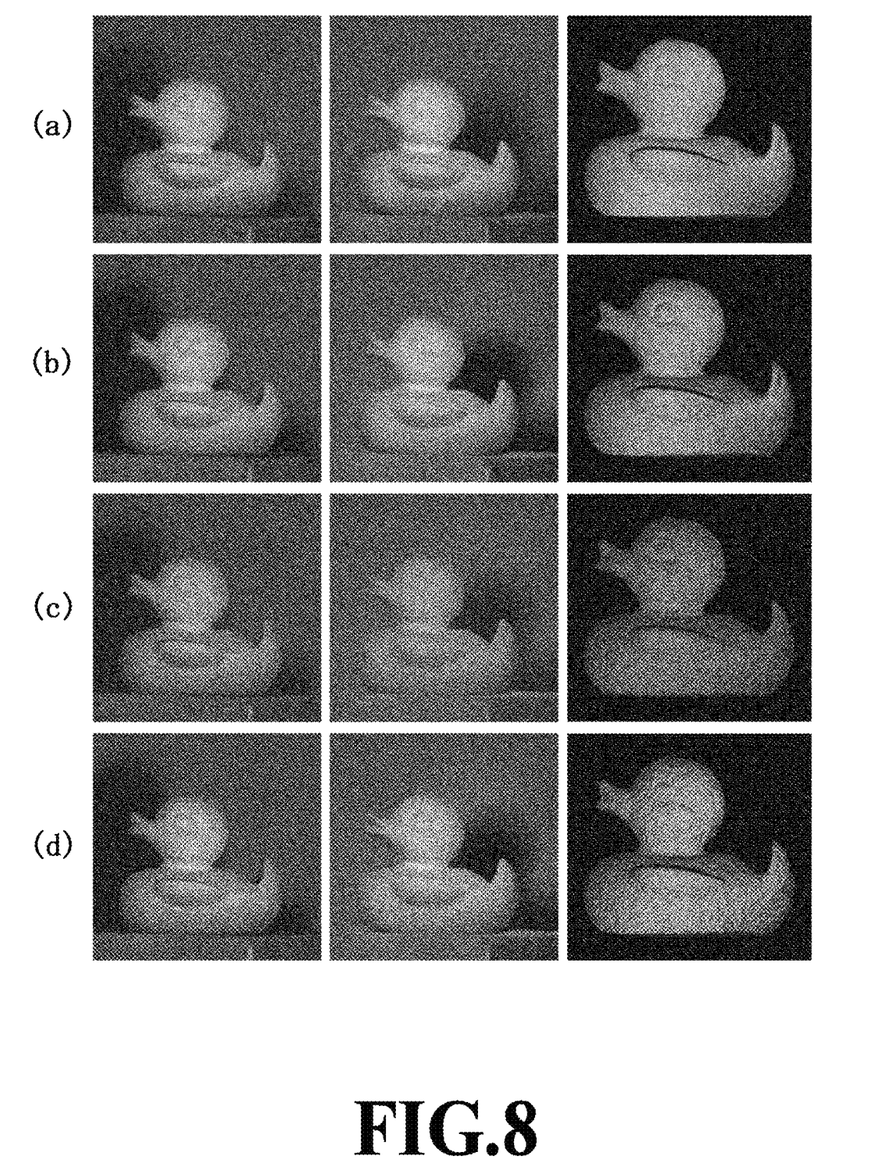
FIG. 8 illustrates Illustrative Embodiment 3 of the present invention.
Figure 9:
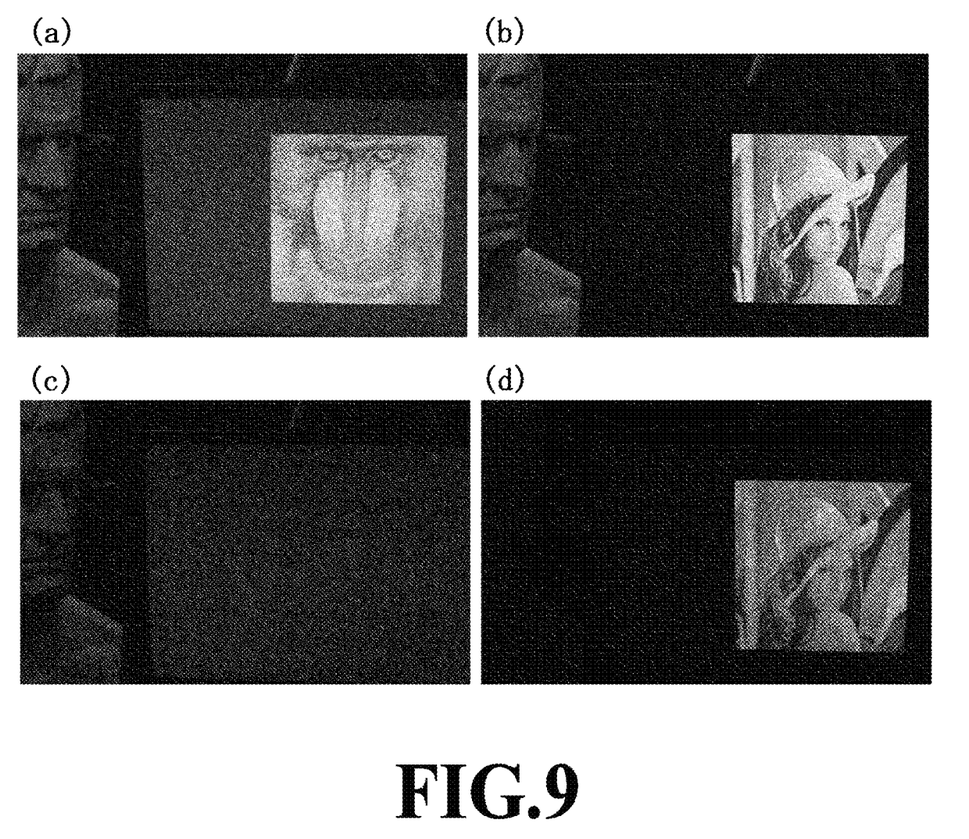
FIG. 9 illustrates Illustrative Embodiment 4 of the present invention.

FIG. 8 illustrates the display image by the display showing the measurement result. The three images in (a) are reference images shot with a long exposure time under the condition that no ambient light exits. (b)-(d) illustrate the images obtained by processing, by the image processing method of the present invention, the images shot by a high speed camera while the LEDs lighted using a spread spectrum modulation signal. In FIGS. 8(b)-8(d), the right end images are a three-dimensional restored image. In (b), the three images are an image obtained without ambient light. (c) and (d) illustrate images obtained with ambient light. In (c), a high-pass filtering as the filtering was performed with the spatial filtering in addition to the high-pass filtering of (d). It would be understood that the reconstruction is successfully implemented such that the duck ornament is sufficiently visible even under the condition in which the ambient light of (c) and (d) exist.

Illustrative Embodiment 4

The following section will describe Illustrative Embodiment 4 with reference to FIGS. 9(a) to 9(d). Illustrative Embodiment 4 illustrates an example when the embedded image embedded in the video image is displayed on the display of the computer (PC) based on the above-described image processing flow of FIG. 3. The display was processed at a refresh rate of 60 Hz. (a) illustrates an input image (video image) in which the face of a baboon may be visually recognized. (b) illustrates an image (female image) embedded using the method (spread spectrum modulation) of the present invention using the spreading code having the length L=31. (c) illustrates an image frame when the embedded image was displayed using the spread spectrum modulation in which a black screen is displayed because the respective pixels of the display have a low brightness and thus the embedded image may not be visually recognized. (d) illustrates a demodulated image obtained when the input image of (a) that may be visually recognized and the embedded image of (c) that may not be visually recognized on the display are shot by the camera while allowing the images to slide in the left-and-right direction to thereby process the shot images by the method of the present invention. In this case, not only the high-pass filtering but also the spatial filtering were performed. The embedded image is displayed (or reproduced).

Embodiments of the present invention have been described with reference to the drawings. However, the present invention is not limited to these embodiments. The present invention may be implemented in aspects in which various improvements, modifications, or variations are made based on the knowledge of those skilled in the art without deviating from its purpose.

REFERENCE SIGNS LIST

1 Body (Object)
10 Light source
12 Imaging apparatus
14 Operation processing apparatus
100 Image processing system

The invention claimed is:

1. An image processing method, comprising:
irradiating flashing light to a surface of an object based on a spreading signal obtained by spread spectrum modulation;
receiving reflected light from the surface of the object and outputting a signal including image information;
filtering for eliminating noise including at least one of a low-frequency component caused by ambient light and a low-frequency component that changes depending on movement of the object from the signal including the image information using a high-pass filter in a time domain;
inverse-spreading and demodulating a signal after the filtering; and
outputting an image reflecting a state of the surface of the object based on a signal obtained by the demodulating.

2. The image processing method according to claim 1, wherein the spreading signal obtained by the spread spectrum modulation is obtained by multiplying a spreading code composed of a pseudo random noise (PN)-sequence with a signal generated by applying primary modulation to a reference signal.

3. The image processing method according to claim 2, wherein the spreading code includes a longest series (MLS) code with a length L.

4. The image processing method according to claim 1, wherein the filtering includes processing the signal including the image information using the high-pass filter and selectively using a spatial filter.

5. The image processing method according to claim 1, wherein the irradiating the flashing light includes irradiating flashing light of a grid pattern.

6. The image processing method according to claim 1, wherein the irradiating the flashing light includes irradiating flashing light including a plurality of lights with different wavelengths.

7. The image processing method according to claim 1, wherein the irradiating the flashing light includes irradiating flashing light from a plurality of different directions.

8. The image processing method according to claim 1, wherein the object comprises a moving object.

9. An image processing system, comprising:
a light source for irradiating flashing light to a surface of an object based on a spreading signal obtained by spread spectrum modulation;
an imaging apparatus for receiving reflected light from the surface of the object and outputting a signal including image information;
a filtering apparatus for eliminating noise including at least one of a low-frequency component caused by ambient light and a low-frequency component that changes depending on movement of the object from the signal including the image information using a high-pass filter in a time domain;
an operation processing apparatus for inverse-spreading and demodulating a signal after processing by the filtering apparatus; and
a display apparatus for displaying an image reflecting a state of the surface of the object based on a signal obtained by the demodulating.

10. The image processing system according to claim 9, wherein the spreading signal obtained by the spread spectrum modulation is obtained by multiplying a spreading code composed of a pseudo random noise (PN)-sequence with a signal generated by applying primary modulation to a reference signal.

11. The image processing system according to claim 10, wherein the spreading code includes a longest series (MLS) code with a length L.

12. The image processing system according to claim 9, wherein the filtering apparatus includes processing the signal including the image information using the high-pass filter and selectively using a spatial filter.

13. The image processing system according to claim 9, wherein the light source is configured to irradiate (i) flashing light of a grid pattern, (ii) flashing light including a plurality of lights with different wavelengths or (iii) flashing light from a plurality of different directions.

* * * * *